United States Patent [19]

Smith

[11] Patent Number: 5,308,096
[45] Date of Patent: May 3, 1994

[54] BICYCLE TRAILER

[75] Inventor: Gilbert Smith, London, Canada

[73] Assignee: Kid Around Kinetica Inc., Cambridge, Canada

[21] Appl. No.: 88,719

[22] Filed: Jul. 9, 1993

Related U.S. Application Data

[63] Continuation-in-part of Ser. No. 832,295, Feb. 7, 1992, abandoned.

[51] Int. Cl.$^5$ .............................................. B62K 27/00
[52] U.S. Cl. ...................... 280/204; 280/30; 280/415.1; 280/47.38; 224/42.01
[58] Field of Search ................ 280/7.12, 24, 47.38, 280/476.1, 415.1, 204, 30, 203, 202; 296/35.4, 37.4, 37.7, 97.21, 37.1; 224/42.01, 328

[56] References Cited

U.S. PATENT DOCUMENTS

| | | | |
|---|---|---|---|
| 2,497,995 | 2/1950 | Julie | 280/7.12 |
| 3,746,357 | 7/1973 | Haskins | 280/24 X |
| 4,342,467 | 8/1982 | Kester | 280/204 |
| 5,020,814 | 6/1991 | George et al. | 280/204 |
| 5,076,599 | 12/1991 | Lockett et al. | 280/204 |

FOREIGN PATENT DOCUMENTS

| | | | |
|---|---|---|---|
| 129309 | 1/1978 | Fed. Rep. of Germany | 224/42.01 |
| 3347095 | 7/1985 | Fed. Rep. of Germany | 280/203 |
| 227733 | 6/1943 | Switzerland | 280/204 |
| 298013 | 10/1928 | United Kingdom | 296/37.4 |

OTHER PUBLICATIONS

Burley Design Cooperative Brochure, Mar. 1988.

*Primary Examiner*—Margaret A. Focarino
*Assistant Examiner*—Victor E. Johnson
*Attorney, Agent, or Firm*—Jeffrey T. Imai; Arne I. Fors; Doak D. Horne

[57] ABSTRACT

A trailer for towing behind a bicycle and having a trailer body with a floor, side walls, front and rear walls, and an open top, a removable top cover for covering the open top, a pair of seats located in the body, side by side with one another, a rigid chassis supporting the body, to which the tow bar and wheels are mounted, a tow bar extending forwardly of the front wall moveably attached to the chassis for connection to a bicycle, a pair of road wheels releasably attached to the chassis, and attachments for securing the body to an automobile roof to adapt the body for use as an automobile luggage carrier.

5 Claims, 5 Drawing Sheets

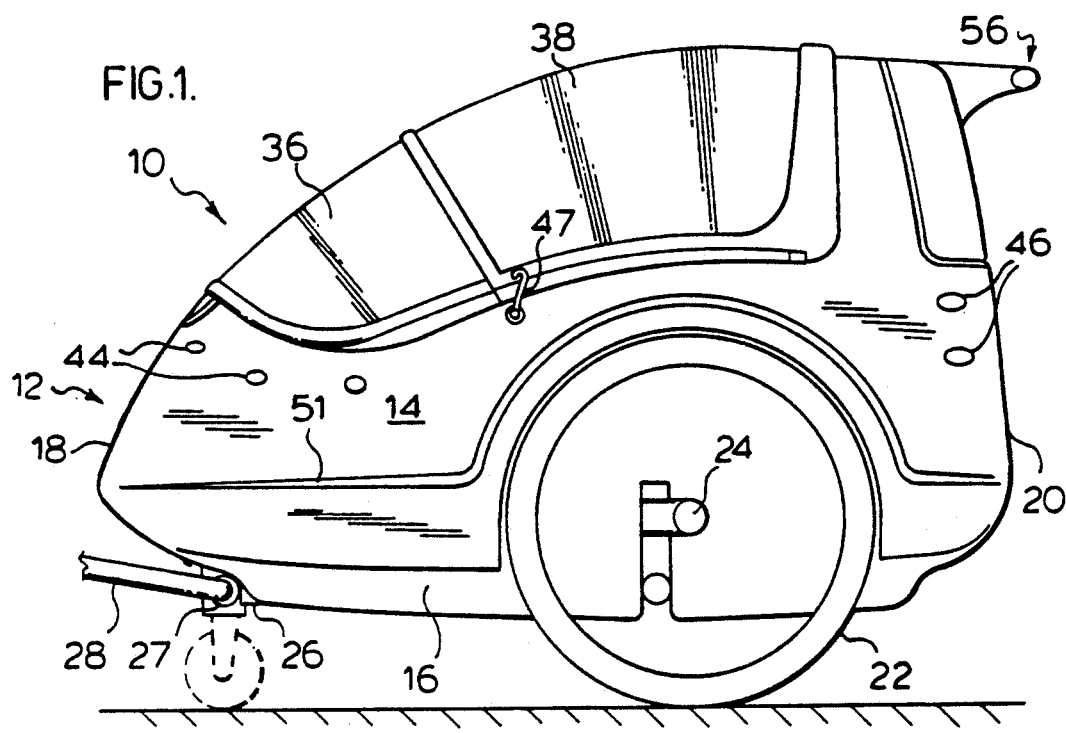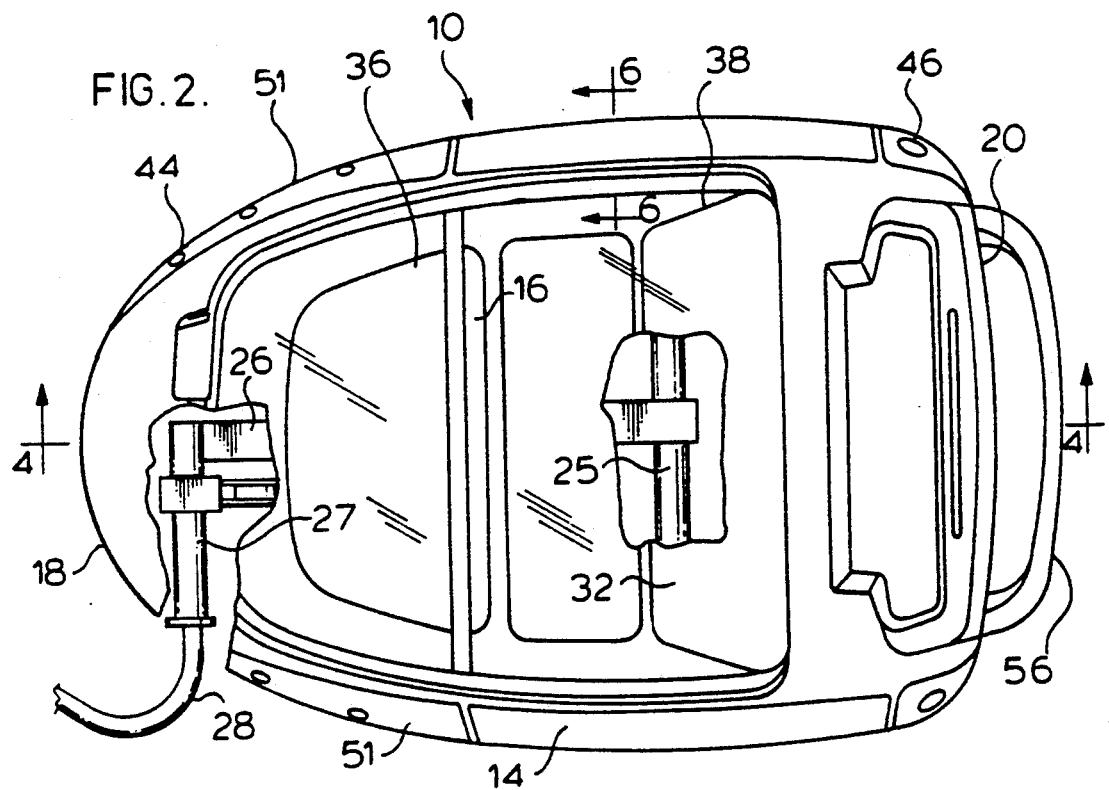

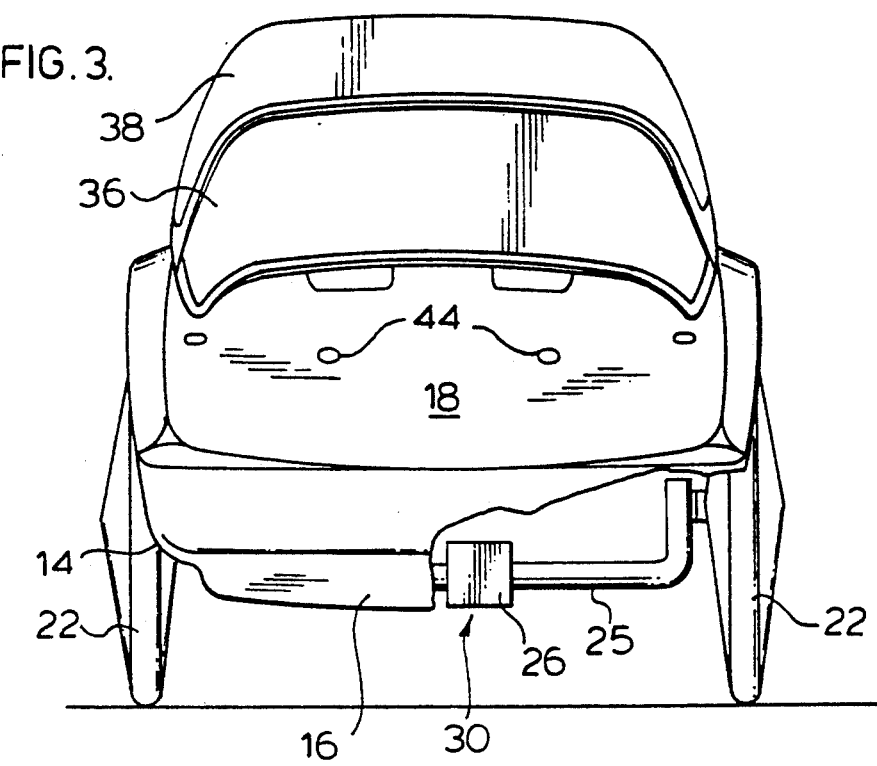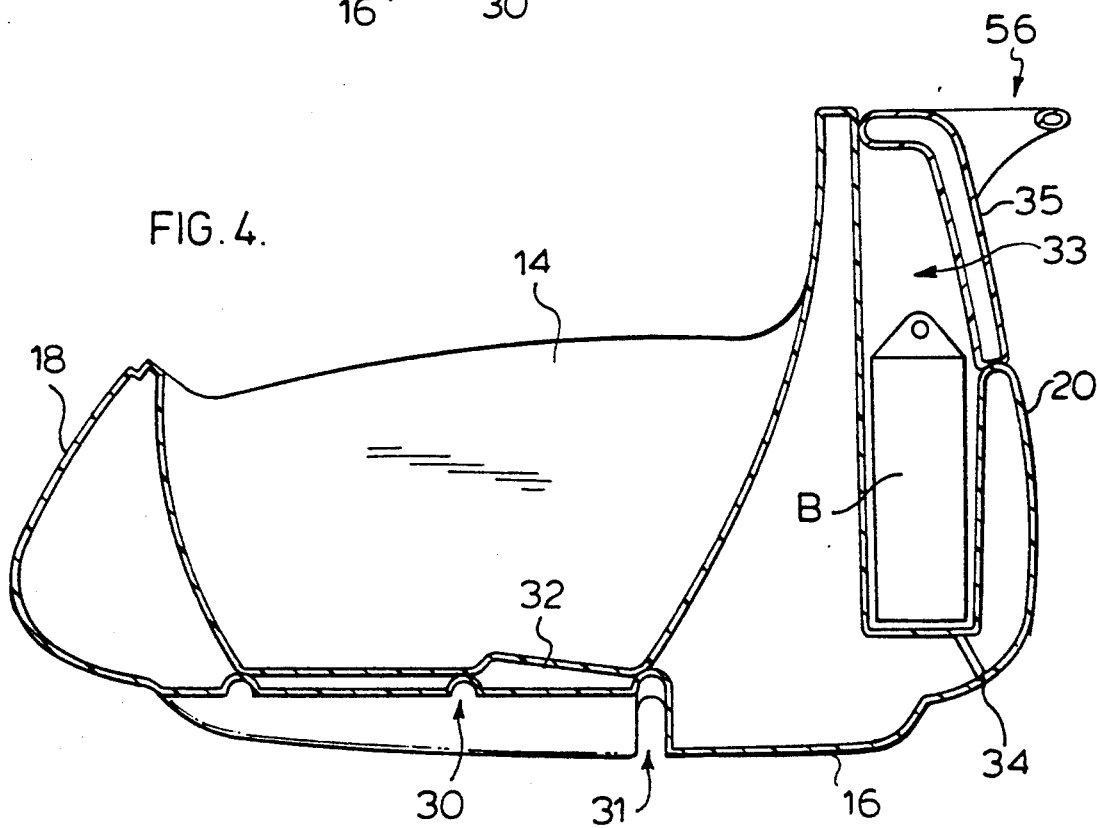

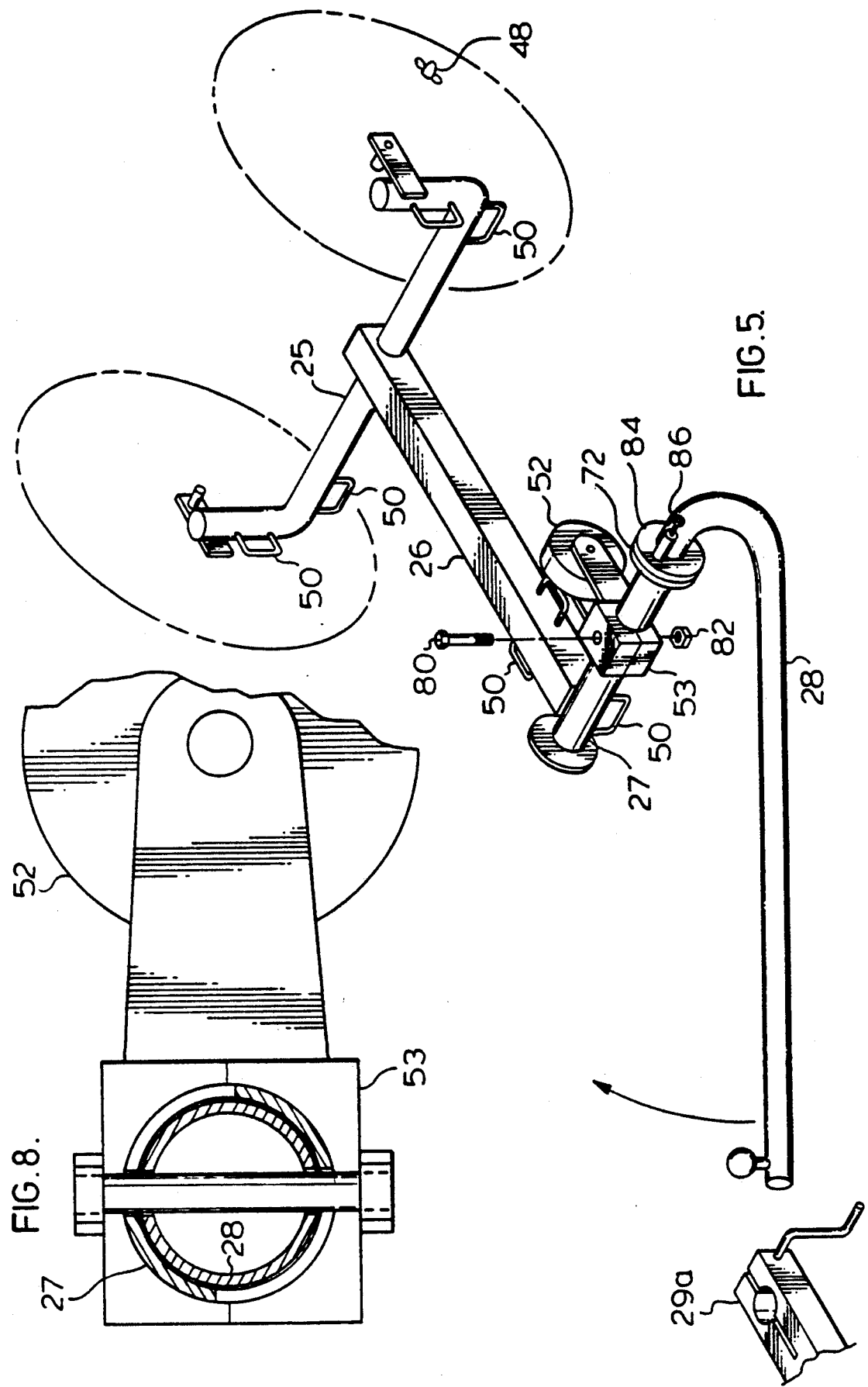

BICYCLE TRAILER

The application is a continuation-in-part application of application Ser. No. 07/832,295, filed Feb. 7, 1992 and now abandoned.

FIELD OF INVENTION

The invention relates to a trailer for attachment to a bicycle, which trailer is adapted for conversion to a variety of different functions.

BACKGROUND OF THE INVENTION

The enjoyment of cycling, as a family activity, presents certain problems. Where the family includes only one or perhaps two infants, infant seats are available, which may be attached behind the saddle over the back wheel of the bicycle. The infant can be strapped in the seat and the parent can then ride the bicycle. However, once the child reaches an age when it can no longer be carried in the infant's seat, then bicycling as a family activity becomes almost impossible. Small children from about the age of three onwards, can no longer be accommodated in an infant's seat. However, such small children, even when they graduate from a tricycle to a small child's bicycle, cannot be expected to cycle with their parents along a roadway, since they are simple unaware of the dangers of cycling on the road. As a result, cycling as a family activity becomes severely restricted. If cycling is to be enjoyed, then the adult bicycles as well as the junior bicycles must be transported to a park, where the children can then safely enjoy cycling without the hazards of traffic.

The use of infant seats on bicycles is to many parents an activity which in itself presents certain safety problems, related to the inherent instability of the bicycle and for these parents the use of such bicycle seats is simply unacceptable. Consequently, it is not possible for them to enjoy the pleasures of cycling, together with their infant children.

Many of these objections could be overcome by the provision of a trailer which could be attached to the bicycle, and in which two infants or two small children could be carried side by side. However, the provision of such a trailer, while clearly being within the capabilities of many experienced designers, has usually been based on the traditional bicycle criteria of light weight, resulting in a vehicle constructed from tubing and fabric, lacking in comfort amenities, ergonomic considerations and aesthetic appeal.

These bicycle trailers have a relatively high price to the general public. Such a trailer, because of its physical limitations and cost will likely be used only on an occasional basis. A great many parents would be willing to invest in a safe, functional and attractive trailer if its usefulness could also be increased.

If such a trailer could be produced with full comfort and amenities for the passengers as well as being convertible into a variety of alternate uses, then the trailer will be more acceptable to the public as a worthwhile investment.

BRIEF SUMMARY OF THE INVENTION

With a view to achieving the foregoing advantages, the invention comprises a trailer which comprises a trailer body portion having a floor, and side walls and front and rear walls and of a predetermined width sufficient to seat two children side by side, and defining an open top, a removable top cover portion for covering said open top, a rigid chassis supporting the body to which a towing bar and wheels are mounted, a towing bar extending forwardly of said chassis and adapted for connection to a bicycle, a pair of road wheels attached to said chassis portion, a pair of seats located side by side and located inwardly with respect to said road wheels, releasable means for releasing said road wheels, and, attachment means for securing said body portion to an automobile roof to adapt said body portion for use as an automobile luggage carrier.

The invention further provides a trailer having the foregoing advantages, and further including a front wheel removably attachable to said chassis portion adjacent said front wall, and handle bar means integral to a rear portion of said body portion whereby said trailer can be converted for use as a stroller.

The invention further provides a trailer having the foregoing advantages and wherein said body portion defines air intake means, and air vent means spaced apart from one another, whereby fresh air may flow through said body portion, when said top cover portion is in position.

The invention further provides a trailer having the foregoing advantages and including attachment lug means adjacent the rear portion of said chassis portion and further attachment means adjacent the front portion of said chassis portion, and skid means attachable between said front and rear attachment means, whereby said trailer may be converted for use on snow, ice, or the like.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a side elevation of a trailer in accordance with the invention, showing portions thereof in phantom;

FIG. 2 is a top plan partially cut away of the trailer of FIG. 1;

FIG. 3 is a front elevation of a trailer of FIG. 1;

FIG. 4 is a section of the trailer body along line 4—4 of FIG. 2;

FIG. 5 is a perspective illustration of the chassis, shown in isolation with wheels in phantom;

FIG. 8 is a side elevational view, partly in section of the stroller wheel pivotting joint.

DESCRIPTION OF THE INVENTION

Figure 7:
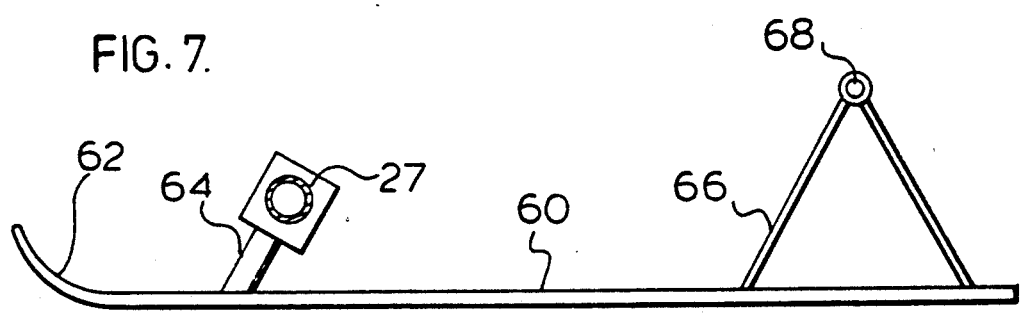
FIG. 7 is a side view of a skid attachment.

Referring first of all to FIGS. 1 to 5, it will be seen that the invention is illustrated in the form of a trailer indicated generally as 10. The trailer 10 has a body indicated as 12, having side walls 14, a floor 16, a front wall 18, and a rear wall 20. It will be appreciated that in the preferred case, as illustrated, the body 12 will be manufactured of a suitable synthetic material which may be, for example, glass fibre reinforced resin, or which may be molded from thermoplastic material or the like in a manner well known in the art so that the entire body will be molded as a single integral structure.

A pair of road wheels 22 are attached on brackets 24 on the chassis cross tube 25 adjacent the rear of the body 12. A longitudinal chassis tube 26 extends forwardly from tube 25 beneath the body 12. The forward end of the chassis tube 26 is provided with any suitable form of swingable joint. A towing bar 28 may be provided with a universal attachment 29 for connection to a bracket 29a on the rear portion of the bicycle frame at the location of the rear wheel hub. The bicycle itself, of course, is not shown since bicycles are in any event well known and require no description.

The joint and towing bar 28 may be provided with a releasable coupling means so that the towing bar 28 can be pivoted upward over the body or detached for storage.

Chassis cross tube 25 has a tube 27 extending substantially perpendicular thereto. (FIG. 5) In the preferred embodiment, tube 27 is welded or suitably attached, depending on the material used for tubes 25 and 27. Tube 27 has a pair of slots 70 which extend circumferentially 90° on opposite sides thereof. On the end of tube 27 is a flange 72 having a first bore 74 and a second bore 76.

Towing bar 28 has a length and diameter that it will extend fully within tube 27. Towing bar 28 has a radially extending bore 78 positioned such that when the towing bar 28 is registered within tube 27, bore 78 will align with slots 70 and flange 84 mounted on towing bar 28 will abut with flange 72 of tube 27. Bore 78 will extend substantially vertically when the towing bar 28 is substantially horizontal. In this position, mounting block 53 having stroller wheel 52 is fitted about tube 27. A bolt 80 extends through mounting block 53 through slots 70, through bore 78 and affixed in place by nut 82.

Towing bar 28 also has a biased pin 86 for locking the towing bar 28 into an upwardly position and a towing position extending forwardly. Since mounting block 53 is mounted onto towing bar 28, front wheel 52 is retracted when the towing bar 28 is in a towing position and is in a stroller position extending downwardly for engaging the ground when the towing bar 28 is in an upwardly position.

An inverted longitudinal channel 30 is formed down the centre of the floor 16 of body 12, and chassis tube 26 extends through such channel. A transverse channel 31 is formed to receive the rear chassis cross tube 25.

Seat 32 are provided in body 12, on either side of channel 30, to receive two small children seated side by side. Suitable restraints (not shown) such as are well known in the art, are provided to secure the children in position.

The seats 32 may be removable, if it is desired to carry some form of luggage (not shown) in the trailer body 12. For example, if adult cyclists wish to carry baggage, such as camping equipment, or picnic equipment or the like, it could be carried in the body 12, or in the rear.

Food products could also be carried in the rear compartment 33, and ice (not shown) on a freezer block B could be included to keep the products fresh.

In this case, at the base of compartment 33 a drain hole 34 may be provided for draining water (FIG. 4), and a moveable cover 35 may be provided for the compartment 33.

The side walls, front wall and rear wall, leave an open top. Around the edge of the side walls and front wall, a fixed transparent windshield 36 is provided, which defines an entry and exit opening, which is closed by means of a moveable top cover or canopy 38. The top cover will typically be made of clear thermoplastic material, and is shaped with a convex curved shape, defining a forward and downward slope.

Figure 6:
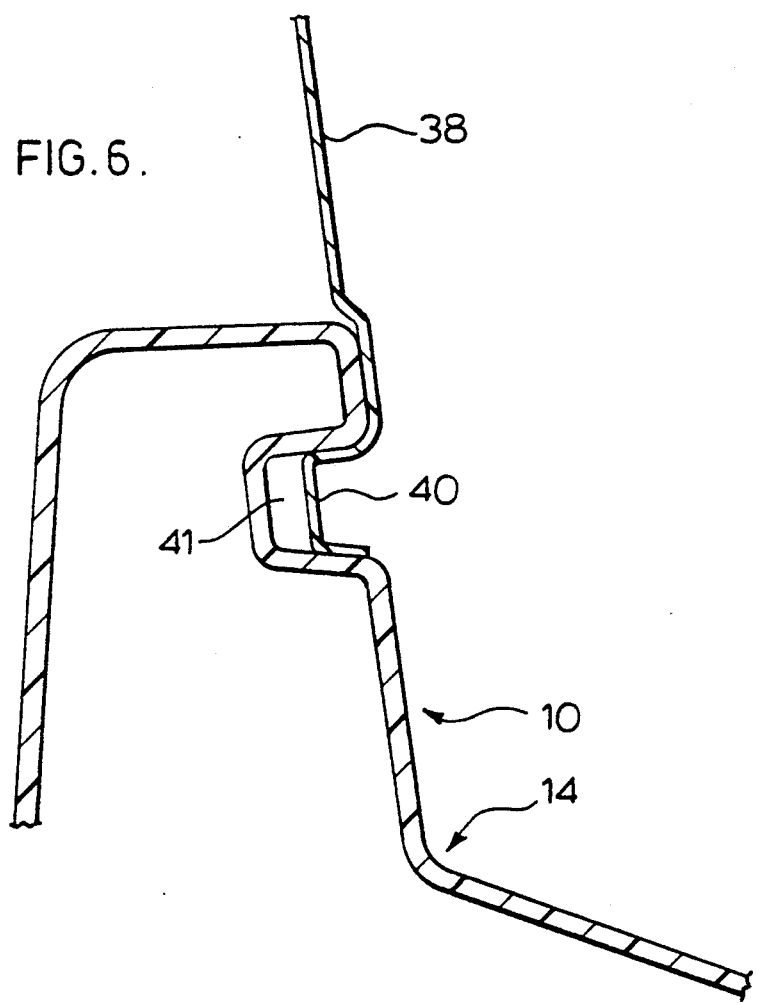
FIG. 6 is a section along line 6—6 of FIG. 2.
Figure 9:
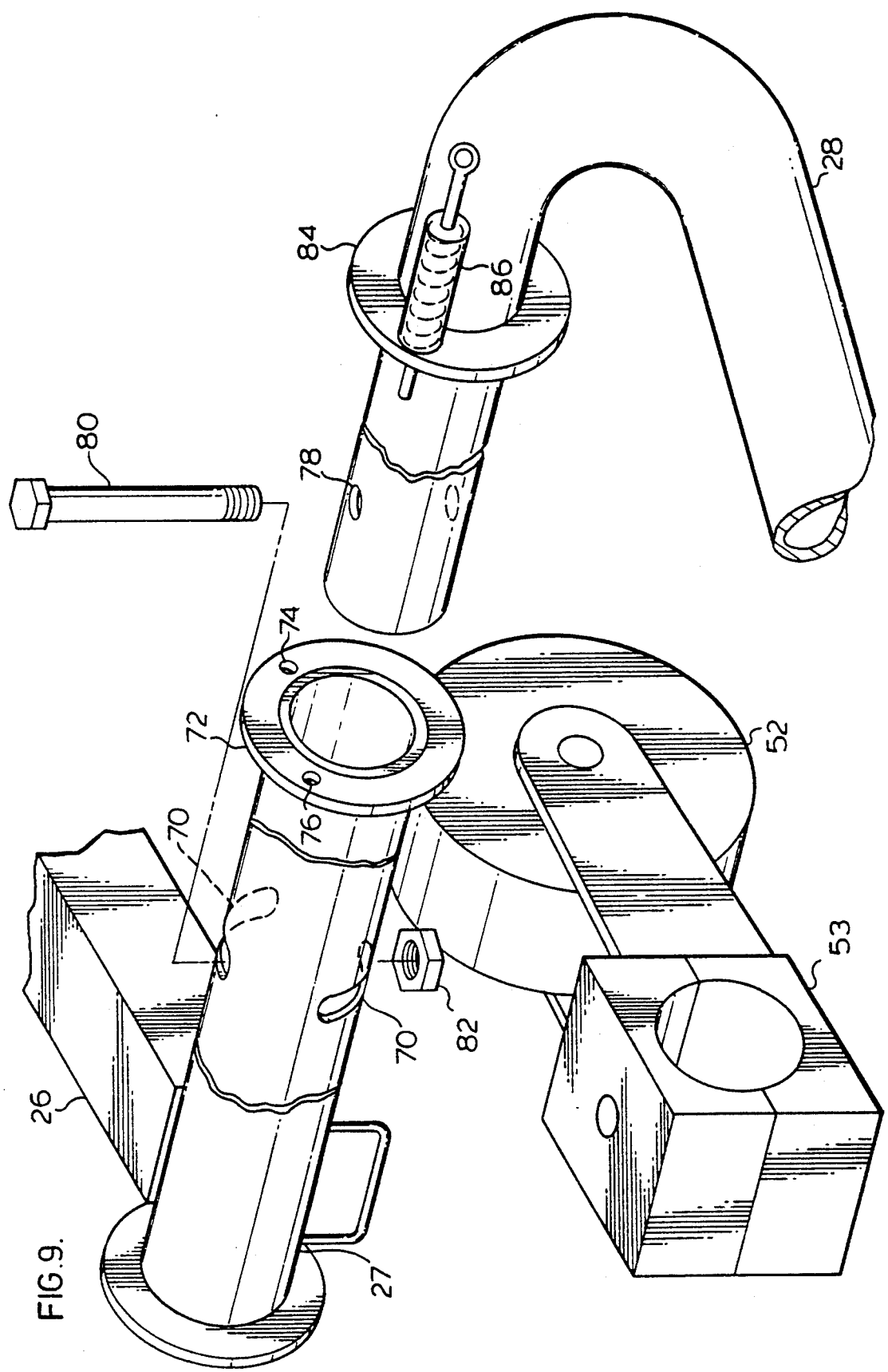
FIG. 9 is a perspective illustration of the stroller wheel of FIG. 8.

The lower edges of the canopy 38, (FIG. 6) are formed inwardly so that lower edges 40 can be engaged in grooves 41 formed in the sides 14 of the body. These inwardly formed edges 40 can be slid forward in the grooves 41 permitting the rear portion of the canopy 38 to slide forward over the windshield 36 and the forward portion of the body 12. Spreading the formed lower edges 40 outward, away from the grooves 41, will permit the removal of the rear portion of the canopy 38. The natural tension of the transparent thermoplastic material used to form the canopy and the inward tension of the sides of the channel-like form of the canopy, will retain the formed lower edges 40 in the grooves 41 of the body. In this way, the top cover or canopy can simply be slid forward, to give access to the interior of the body 12, and when not required, the top cover can simply be removed.

In order to provide fresh air ventilation, air vents 44 are provided int he front wall 18, and further air vents 46 are provided in the top of the rear wall 20, (FIG. 1) so as to provide a flow path for air.

In order to secure the top cover or canopy, any suitable form of latch device 47 (FIG. 1) may be provided on either side end of the canopy, of any suitable design.

The road wheels 22 are removably attached on the axle brackets 24 by means of, for example, wing nuts 48 (FIG. 5). In this way, the road wheels can be removed when it is desired to convert the trailer for some other use. In addition, the towing bar 28 can be removed from the tube 27 removing stroller wheel 52. This will then leave the body 12, without wheels or projecting towing bar or axle.

On the chassis 26, a plurality of attachment lugs 50 (FIG. 5) are provided. The attachment lugs enable fastening straps (not shown) to be connected to the chassis 25-26. Such fastening straps can then be used to attach the body 12 and chassis to the roof of an automobile, for example. In this case, the body 12 then serves as an additional luggage carrier for the automobile.

In order to convert the trailer for use as a stroller, (FIG. 5) biased pin 86 is released unlocking the towing bar 28 allowing the towing bar 28 to be pivoted upwardly and rearwardly pivoting the front wheel or wheels 52 downwardly into a ground engaging condition. Biased pin 86 is engaged locking the towing bar 28 into the upwardly position.

In order to push the body 12 in this configuration, a handle 56 (FIG. 4) would be provided, which may be integral to the rear wall 20, for example, or integral to the moveable cover 35 of the rear compartment 33.

In order to adapt the trailer for use on snow and ice, as shown in FIG. 7, a pair of skid attachments indicated generally as 60 may be provided. The skid attachments 60 consist essentially of a generally flat ski-like device having an upturned tip 62.

Adjacent to the tip 62, an attachment stub 64 is provided to be received in the attachment in the forward end of chassis. At its rearward end skid 60 has support legs 66 having openings 68 thereon. Legs 66 may be attached to axle brackets 24. In this configuration, the towing bar would generally be retained and could either be attached to a snow vehicle such as a snowmobile, or alternatively, the towing bar could be provided with some form of handle (not shown) by means of which it could be manually pulled along.

The foregoing is a description of a preferred embodiment of the invention which is given here by way of example only. The invention is not to be taken as limited to any of the specific features as described, but comprehends all such variations thereof as come within the scope of the appended claims.

I claim:

1. A convertible trailer for towing behind a bicycle, said trailer convertible between a trailer, a stroller and an automobile luggage carrier, said trailer comprising
   a rigid chassis, said chassis having a closable compartment for storing food products, said closable compartment having a drain at a lowermost extent thereof for draining said compartment and having a cover for releasably closing said compartment,
   a trailer body portion having a floor, side walls and front and rear walls defining a cavity having an opening, said trailer mounted on said chassis,
   a top cover portion releasably mounted on the body portion for covering the opening,
   a seat releasably mounted in the cavity of the body portion,
   a towing bar hingedly connected to a forward portion of the chassis, for pivoting between a towing position extending forwardly of the chassis and an upwardly extending position,
   a pair of wheels rotatably and releasably mounted on a rearward end of the chassis,
   a stroller wheel releasably and pivotally mounted on the forward end of the chassis and pivotal between a stroller position for stably supporting the forward end of the chassis and a retracted position,
   a handle on a rear portion of the body and extending from said cover end said handle adapted for pushing the trailer as a stroller, and
   attachment means mounted on the chassis for securing said chassis to an automobile roof, wherein said trailer is convertible between a trailer condition, a stroller condition and a carrier condition, said trailer condition is characterized by the towing bar in the towing position, the stroller wheels in the retracted position and the pair of wheel rotatably mounted on the chassis, said stroller condition is characterized by the towing bar in an upwardly extending position, the stroller wheel in the stroller position and the pair of wheels rotatably mounted on the chassis and the carrier condition is characterized by the towing bar, the stroller wheel and the pair of wheels removed from the chassis.

2. A trailer as claimed in claim 1 wherein said body portion defines air intake means, air vent means spaced apart from apart from one another, whereby fresh air may flow through said body, when said top cover portion is in position.

3. A trailer as claimed in claim 1 and including skid means attachable to said trailer whereby said trailer may be converted for use on snow and ice.

4. A trailer as claimed in claim 1 wherein said cover has said handle extending therefrom.

5. A trailer as claimed in claim 1 wherein said includes a locking means for releasably locking the towing bar in either the towing position or the upwardly extending position.

* * * * *